United States Patent
De Groot

(10) Patent No.: US 10,900,666 B2
(45) Date of Patent: Jan. 26, 2021

(54) WALL PART, HEAT BUFFER AND ENERGY EXCHANGE SYSTEM

(71) Applicant: ECOVAT IP B.V., Veghel (NL)

(72) Inventor: Adrianus Wilhelmus De Groot, Uden (NL)

(73) Assignee: ECOVAT IP B.V., Veghel (NL)

( * ) Notice: Subject to any disclaimer, the term of this patent is extended or adjusted under 35 U.S.C. 154(b) by 0 days.

(21) Appl. No.: 16/011,322

(22) Filed: Jun. 18, 2018

(65) Prior Publication Data

US 2018/0299139 A1    Oct. 18, 2018

Related U.S. Application Data

(63) Continuation of application No. 14/901,679, filed as application No. PCT/NL2014/050422 on Jun. 26, 2014, now Pat. No. 10,024,549.

(30) Foreign Application Priority Data

Jun. 28, 2013 (NL) .................................... 2011061

(51) Int. Cl.
*F24D 3/12* (2006.01)
*F24H 7/04* (2006.01)
(Continued)

(52) U.S. Cl.
CPC ............... *F24D 3/12* (2013.01); *F24D 3/127* (2013.01); *F24D 11/003* (2013.01); *F24H 7/00* (2013.01);
(Continued)

(58) Field of Classification Search
CPC .......... F24D 3/12; F24D 3/127; F24D 11/003; F24H 7/00; F24H 7/04; F28D 2020/0008;
(Continued)

(56) References Cited

U.S. PATENT DOCUMENTS 947,205 A * 1/1910 Tanchoff ................. C04B 28/34
126/64
2,707,984 A 5/1955 Goff et al.
(Continued)

FOREIGN PATENT DOCUMENTS

DE    2136137 A1    2/1973
DE    2846348 A1    5/1980
(Continued)

OTHER PUBLICATIONS

FOAMGLAS® Insulation Systems; Protecting Companies and Their People Worldwide (Year: 2009).
(Continued)

*Primary Examiner* — Gordon A Jones
(74) *Attorney, Agent, or Firm* — AEON Law, PLLC; Adam L.K. Philipp; David V.H. Cohen

(57) ABSTRACT

Heat buffer comprising at least mechanically coupled wall parts, wherein each of the wall parts comprises a substantially plate-like body; a liquid throughflow circuit incorporated in the body; one or more hydraulic couplings accessible from the outer side of the wall part for discharge and supply of liquid to the liquid throughflow circuit and configured for coupling to hydraulic couplings of a similar device; and is coupled at a mutual angle about a substantially vertical axis to a similar wall part, wherein the mechanically coupled devices are connected such that they enclose one space and wherein the heat buffer also comprises a floor and/or cover part for closing the enclosed space on an upper and/or underside.

29 Claims, 6 Drawing Sheets

(51) Int. Cl.
*F28D 20/00* (2006.01)
*F24D 11/00* (2006.01)
*F24H 7/00* (2006.01)

(52) U.S. Cl.
CPC ........... *F24H 7/04* (2013.01); *F28D 20/0043* (2013.01); *F28D 20/0052* (2013.01); *F28D 20/0056* (2013.01); *F28D 2020/0008* (2013.01); *Y02B 10/20* (2013.01); *Y02B 30/00* (2013.01); *Y02E 60/14* (2013.01)

(58) Field of Classification Search
CPC ............ F28D 20/0043; F28D 20/0052; F28D 20/0056; F24B 1/04
See application file for complete search history.

(56) References Cited

U.S. PATENT DOCUMENTS

| | | | |
|---|---|---|---|
| 3,712,012 | A | 1/1973 | Meyer et al. |
| 4,235,221 | A | 11/1980 | Murphy |
| 7,891,187 | B2 | 2/2011 | Mohr |
| 2009/0249726 | A1* | 10/2009 | Garcia Fernandez .. E04C 2/523 52/506.01 |
| 2011/0303214 | A1 | 12/2011 | Welle |
| 2013/0292100 | A1* | 11/2013 | Karlsson ................. E04C 1/392 165/163 |
| 2014/0069605 | A1* | 3/2014 | Sullivan ................. B21D 47/00 165/56 |

FOREIGN PATENT DOCUMENTS

| | | | |
|---|---|---|---|
| DE | 2931861 | A1 | 2/1981 |
| DE | 29518313 | U1 | 2/1996 |
| DE | 102005052162 | A1 | 5/2006 |
| DE | 202006005592 | U1 | 8/2007 |
| EP | 2678981 | A1 | 4/2013 |
| FR | 2237156 | A1 | 2/1975 |
| GB | 1527223 | A | 10/1978 |
| JP | 228230 | A | 10/1986 |
| WO | WO-9428319 | A1 * | 12/1994 ........... B65D 88/744 |

OTHER PUBLICATIONS

O.O. Fasina & Z. Colley; Viscosity and Specific Heat of Vegetable Oils as a Function of Temperature: 35° C. to 180° C. (Year: 2009).
O'Meara, Meghan; Determination of the Interfacial Tension between Oil/Steam and Oil/Air at Elevated Temperatures. (Under the Direction of Dr. Brian Farkas.) (Year: 2012).

* cited by examiner

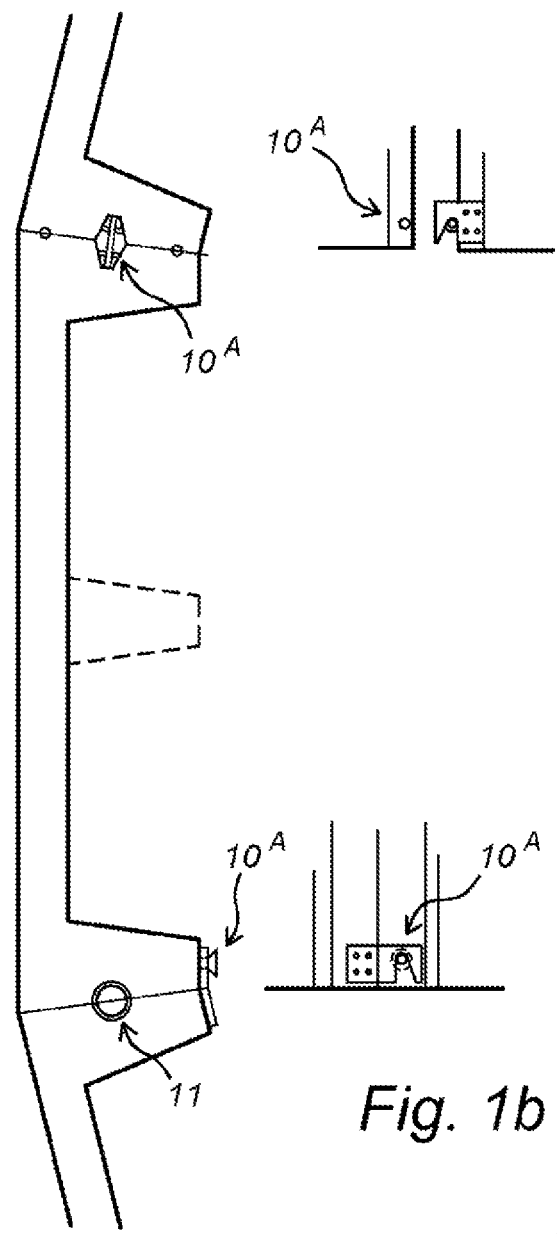
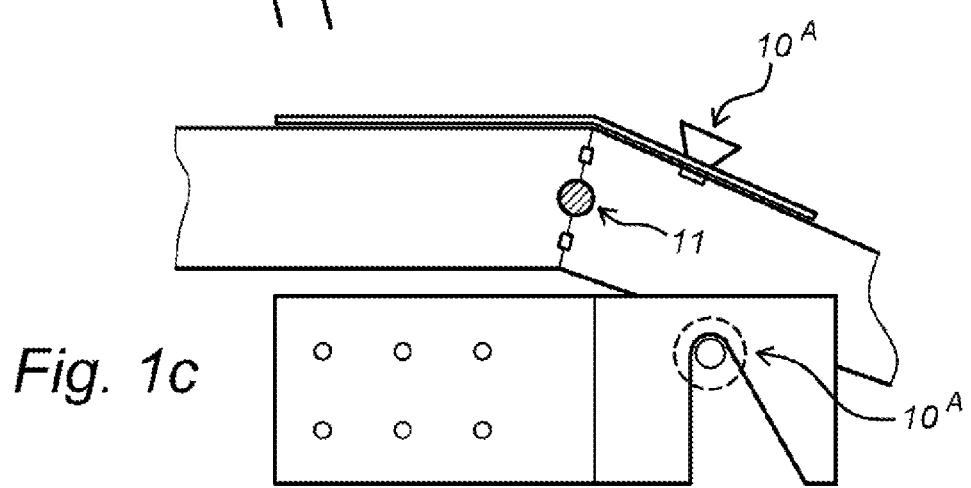
Fig. 1b
Fig. 1c

| Day | Temp. in degrees | Weighting factor | | |
|---|---|---|---|---|
| -5 | 1.00 | 1 | 1.00 | Set point -5 |
| -4 | 1.60 | 2 | 3.20 | |
| -3 | 2.70 | 3 | 8.10 | |
| -2 | 2.30 | 4 | 9.20 | |
| -1 | 2.70 | 5 | 13.50 | Set point -1 |
| 0 | 3.10 | 6 | 18.60 | Today |
| +1 | 3.00 | 7 | 21.00 | Forecast +1 |
| +2 | 2.30 | 8 | 18.40 | |
| +3 | 5.10 | 7 | 35.70 | |
| +4 | 7.10 | 6 | 42.60 | |
| +5 | 7.30 | 5 | 36.50 | Forecast +5 |

Average outdoor temp.  3.85

| | | | | | |
|---|---|---|---|---|---|
| 0 | 20130405 | 6 | 53 | 31 | 1156 |
| +1 | 20130406 | -18 | 64 | 30 | 925 |
| +2 | 20130407 | -27 | 69 | 23 | 1303 |
| +3 | 20130408 | 0 | 90 | 51 | 1985 |
| +4 | 20130409 | 50 | 90 | 71 | 1274 |
| +5 | 20130410 | 60 | 91 | 73 | 1421 |

| Weighted Temp. | Set point | |
|---|---|---|
| 18 | 22.00 | |
| 17 | 22.45 | |
| 16 | 22.89 | -0.45 |
| 15 | 23.34 | -0.45 |
| 14 | 23.79 | -0.45 |
| 13 | 24.23 | -0.45 |
| 12 | 24.68 | -0.45 |
| 11 | 25.13 | -0.45 |
| 10 | 25.57 | -0.45 |
| 9 | 26.02 | -0.45 |
| 8 | 26.46 | -0.45 |
| 7 | 26.91 | -0.45 |
| 6 | 27.36 | -0.45 |
| 5 | 27.80 | -0.45 |
| 4 | 28.25 | -0.45 |
| 3 | 28.70 | -0.45 |
| 2 | 29.14 | -0.45 |
| 1 | 29.59 | -0.45 |
| 0 | 30.04 | -0.45 |
| -1 | 30.48 | -0.45 |
| -2 | 30.93 | -0.45 |
| -3 | 31.38 | -0.45 |
| -4 | 31.82 | -0.45 |
| -5 | 32.27 | -0.45 |
| -6 | 32.71 | -0.45 |
| -7 | 33.16 | -0.45 |
| -8 | 33.61 | -0.45 |
| -9 | 34.05 | -0.45 |
| -10 | 34.50 | |
| | 12.50 | |
| Per Degree | 0.45 | |

| | |
|---|---|
| 3.85 | 28.32 |

*Fig. 4*

WALL PART, HEAT BUFFER AND ENERGY EXCHANGE SYSTEM

The present invention relates to a wall part for manufacturing a heat buffer, a thus manufactured heat buffer and an energy exchange system in which such a buffer is incorporated.

Energy exchange systems are per se known. Their general principle is to store heat and cold at the moment that there is a surplus and to utilize this heat at times of demand, particularly seasonal storage from summer to winter. This usually involves solar heat and thermal heat generated in particular with heat pumps which are controlled with their own current from their own PV panels which is stored underground, wherein a liquid such as water and/or glycol is used to provide heat capacity, cold capacity or a combination of the two.

The known systems do of course meet a certain demand but they also have diverse drawbacks, particularly in respect of a low efficiency or a limited degree of storage capacity, scalability or applicability in an existing built-up area.

It is therefore an object of the present invention to obviate at least some of the above stated drawbacks or to provide a usable alternative to the prior art.

The invention provides for this purpose a heat buffer according to claim 1 and a wall part for forming a heat buffer, comprising a substantially plate-like body, at least one liquid throughflow circuit incorporated in the body, one or more hydraulic couplings accessible from the outer side of the wall part for discharge and supply of liquid to the liquid throughflow circuit and configured for coupling to hydraulic couplings of a similar wall part.

In an embodiment at least some of the wall parts will be coupled and connected by means of the so-called Tichelmann connection principle, whereby uniform pressure losses and attendant energy-saving use of the pumps for circulating the liquid can be achieved.

The wall part according to the present invention provides the option of forming, by means of coupling to similar or identical wall parts, an assembly of optionally hydraulically coupled or connected parts, and thus forming a heat buffer with a storage capacity of any desired size. The wall part can for this purpose be for instance substantially plate-like, rectangular, trapezium-shaped or optionally curved. The liquid throughflow circuit is configured to form part of or to form a heat exchanger. An assembly of wall parts according to the present invention is for this purpose brought into contact with a medium with a suitable heat capacity, which can in particular be groundwater. For this specific purpose the wall parts are then placed under the ground, for instance in the groundwater.

The wall part according to the invention can be a latticework for holding a hose or tube and can also be provided with such a hose or tube intended for placing in a recess which is provided for the purpose in the ground and which is then poured full of for instance concrete. (Nets with) conduit registers cast into a (thus prefab) concrete element can however also be applied. Such elements can be embedded directly in the ground or also in still liquid concrete.

The parts can take an insulated form, wherein the liquid throughflow circuit can have been or be formed by a hose or tube cast into the concrete or a conduit register arranged on the wall part.

Such prefab parts in particular can be provided with a seal for sealing a contact surface of the two wall parts in liquid-tight and preferably thermally sealed manner in the situation where they are coupled to a similar wall part.

The mechanical coupling is preferably configured to couple similar devices with their walls at an angle to each other. An endless assembly, particularly a polygon, which encloses the medium can in this way be formed by mutually connecting wall parts according to the present invention. The wall parts can have for instance a trapezium-shaped cross-section for this purpose.

In an embodiment a first wall part can be coupled to a similar second wall part by means of a mechanical coupling, for instance comprising at least one protrusion and one hook, wherein the protrusion is provided on the first wall part and the hook is provided on the second wall part. It is of course possible to envisage a plurality of protrusions and hooks, wherein it is also possible for a wall part to be equipped with both protrusions and hooks for the purpose of connecting one adjacent wall part.

For the purpose of installing an underground buffer it is recommended that the protrusion and the hook are placed such that the second wall part can be coupled substantially in vertical direction to the first wall part. Wall parts can in this way be placed in the ground and connected to each other one by one.

The wall parts according to the present invention preferably have a width of between one and four metres, a height of between ten and twenty-five metres and a thickness of between zero and one and a half metres.

The present invention also relates to a heat buffer comprising at least two wall parts as according to any of the foregoing claims, and in particular wherein the mechanically coupled devices are connected such that they enclose a space. They more preferably also comprise a floor and/or cover part for closing the enclosed space on an upper and/or underside. A desired volume of the heat buffer lies between 15 and 25,000 $m^3$ and can even rise to 60,000 $m^3$. The aim according to the present invention is the largest possible tank so that, with a relatively small difference in temperature, the highest possible energetic storage capacity, and therefore the highest possible efficiency, can be obtained.

In order to obtain an exceptionally high efficiency the heat buffer can comprise a plurality of preferably connected groups of coupled wall parts arranged around each other. An exemplary configuration comprises for instance concentric circles or polygons, although a zigzag or meandering form can also be envisaged. The heat buffer is filled with a medium for storing energy, for which purpose groundwater or other liquid can for instance be chosen.

The heat buffer can also comprise a plurality of preferably connected groups of coupled wall parts arranged one above another, wherein a thermal barrier, for instance formed by a partition or otherwise substantially horizontally extending element such as a floor part, is arranged in each case between the wall parts arranged one above another in order to make use in this way of the natural stratification of water layers due to the temperature differences.

The groups arranged around or above each other, which thus form their own compartments, can be used to store volumes of the medium with different temperature, wherein it is possible to draw each time from the compartment with the temperature most suitable for that moment.

The efficiency of the heat buffer can be increased considerably when it is surrounded by an extra outer wall. Such an outer wall can be arranged in the ground prior to placing of the heat buffer. A technique suitable for the purpose is the per se known cutter soil mixing. A space is cleared here in the ground, for instance by means of drilling or milling, which space is filled with a material, such as cement, which is curable optionally in combination with moisture present in the ground.

In a preferred embodiment of the present invention the outer wall is placed at a distance from the heat buffer (to be formed), so that a cavity results. This cavity can be left empty or be filled with an insulating material of choice which, just as the content of the buffer, can be water.

Such a buffer can be manufactured by placing a cavity in the above described manner, subsequently positioning the wall parts and then fixing these in their positions. Use can be made for this fixing of a clamping means of controllable size, for instance a bag which is placed between the outer wall and the wall parts and is then filled, for instance with a cement.

The present invention further relates to an energy exchange system, comprising a heat buffer as described above, a hydraulic heat exchange system connected to the liquid throughflow circuit of at least one of the wall parts of the heat buffer, comprising at least one heat absorbing device for absorbing heat or cold, relinquishing thereof to a liquid and carrying the liquid to which the heat has been relinquished to the liquid throughflow circuit; and at least one heat generating device for receiving liquid carried through the liquid throughflow system and generating heat, such as a heating system in a building. Due to the use of the efficient buffer according to the invention such a device has an exceptionally high efficiency. It is hereby even possible in an embodiment for the energy exchange system to comprise a plurality of heat generating devices placed in a plurality of buildings, and to mutually couple a plurality of buffers so that a network of buffers is created.

In a preferred embodiment of the present invention the energy exchange system comprises a control system for controlling the liquid flow between the heat exchange system, the heat absorbing device and the heat generating device. Such a control system controls the heat supply and discharge to and from the heat buffer.

The control system according to the present invention is characterized in a preferred embodiment in that the control system is configured to receive a temperature forecast for the relevant location, wherein the control system is configured to store energy in or generate energy from the tank on the basis of the received temperature forecast.

The temperature forecast can be obtained from a meteorological institute, via an RSS feed or in other per se known manner. The energy exchange system according to the present invention is still more particularly characterized in that the control system is configured to store energy in or generate it from the heat buffer on the basis of the temperatures measured in the past and the temperatures expected in the future, wherein each measuring point in the past and each measuring point in the future is weighted with its own weighting factor. The quantity of energy from the buffer to be generated or absorbed is determined on the basis of such a weighting factor for the purpose of bringing a building to and/or keeping it at a determined temperature. In a further embodiment the energy from the building is used to charge the buffer and carry cold from the buffer to the building. Because the tank is divided into different temperature levels created by the natural stratification of the water in the tank, the correct level of charging and discharging can be determined by means of control engineering.

In a further embodiment of the present invention measuring points in the past are weighted with a lower factor than measuring points in the future. In yet another embodiment the control system is configured to adjust the control on the basis of the difference between the temperature forecast and an actually measured temperature, such as that in a connected building and/or the buffer tank.

The invention will now be elucidated with reference to the following figures. Herein:

FIGS. 1a,b show a sectional view of a wall part according to the present invention;

Figure 3A:
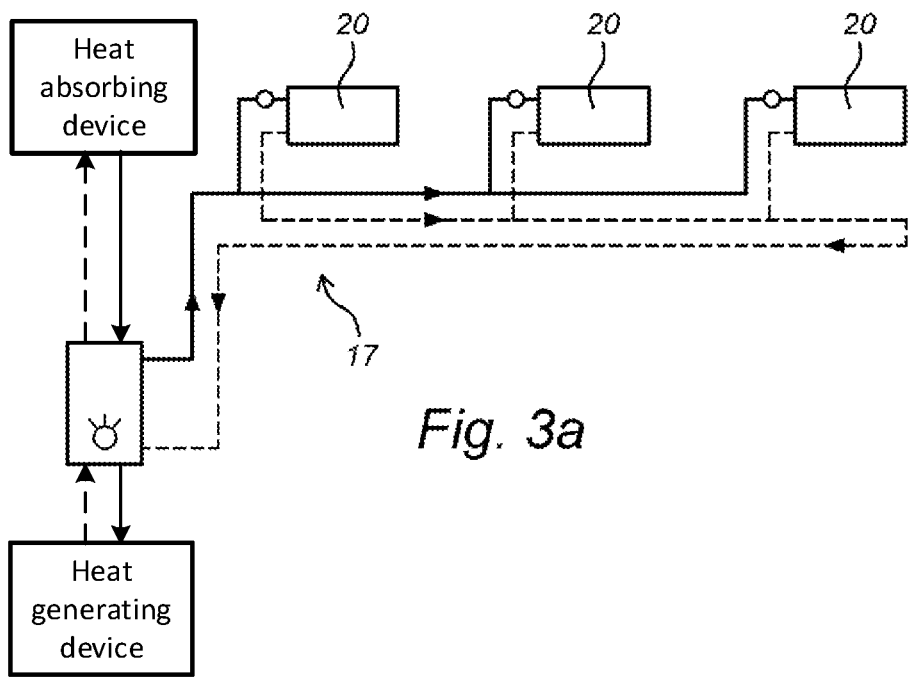
Figures 3B, 3C:
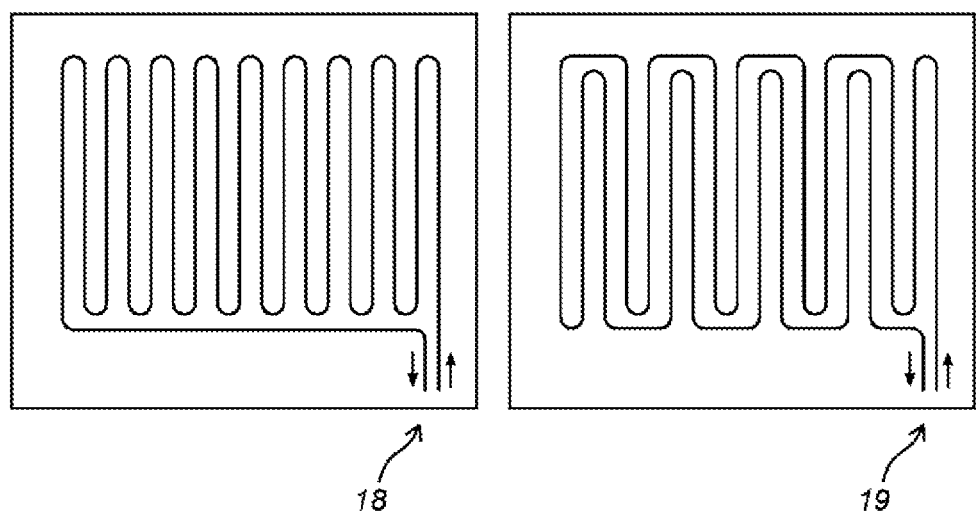
Figure 5:
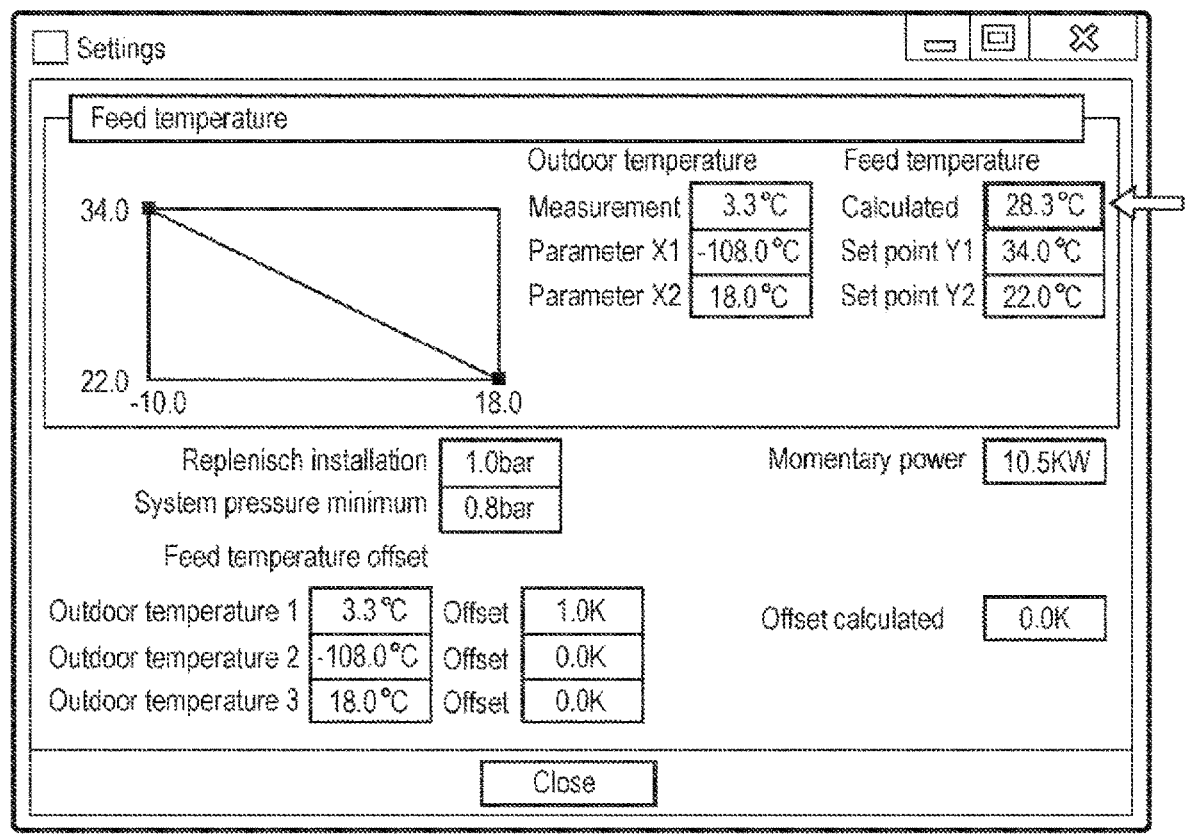

FIGS. 3a-c show schematic views of the hydraulic system of an energy storage system according to the present invention;

FIG. 4 shows an example of a weighting of measuring points in a system according to the present invention; and FIG. 5 shows a user interface of software for adjusting the control system according to the present invention.

Figure 1A:
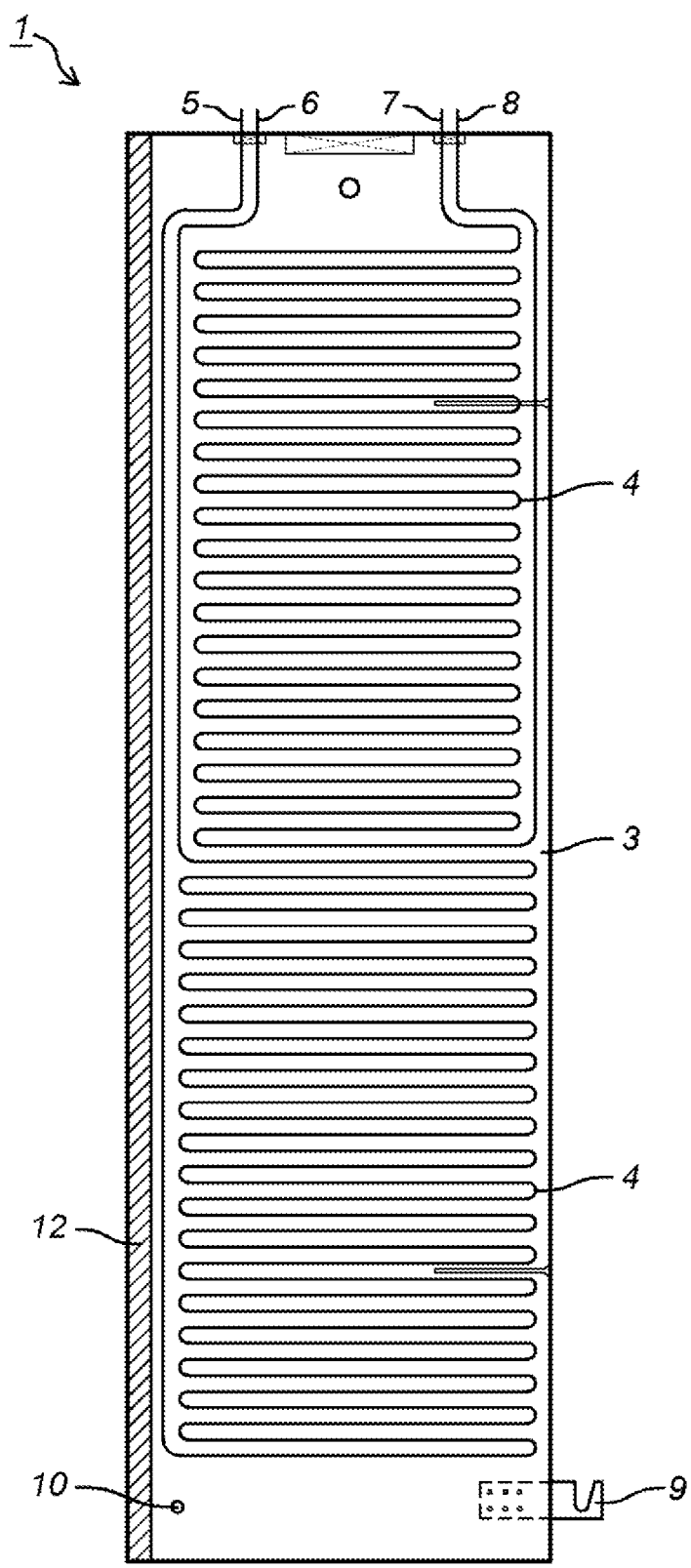
FIG. 1c shows the protrusion and hook construction of FIGS. 1a and 1b in detail.

FIG. 1a shows a sectional view 1 of a wall part 2 according to the present invention, comprising a substantially plate-like body 3 with a liquid throughflow circuit 4 incorporated in the body, and four hydraulic couplings 5, 6, 7, 8 accessible from the outer side of wall part 2 for discharge and supply of liquid to the liquid throughflow circuit 4 and configured for coupling to hydraulic couplings of a similar device. Also visible is a mechanical coupling 9, 10 provided on the wall part and comprising a protrusion 10 and a hook 9 for coupling wall part 2 to at least one similar wall part. Finally shown is a seal 12 for liquid-tight sealing of a contact surface of the two wall parts in the situation where they are coupled to a similar wall part. FIG. 1b shows a top view of an alternative embodiment 2A. Shown in protrusion 10A is a seal 11, and it can be clearly seen that the cross-section of this embodiment is a trapezium-shaped cross-section. It can also be seen that protrusions 10A and the associated hooks can be located on the outer side of a wall part as well as on an end surface. FIG. 1c shows the protrusion and hook construction of FIGS. 1a and 1b in detail.

Figure 2:
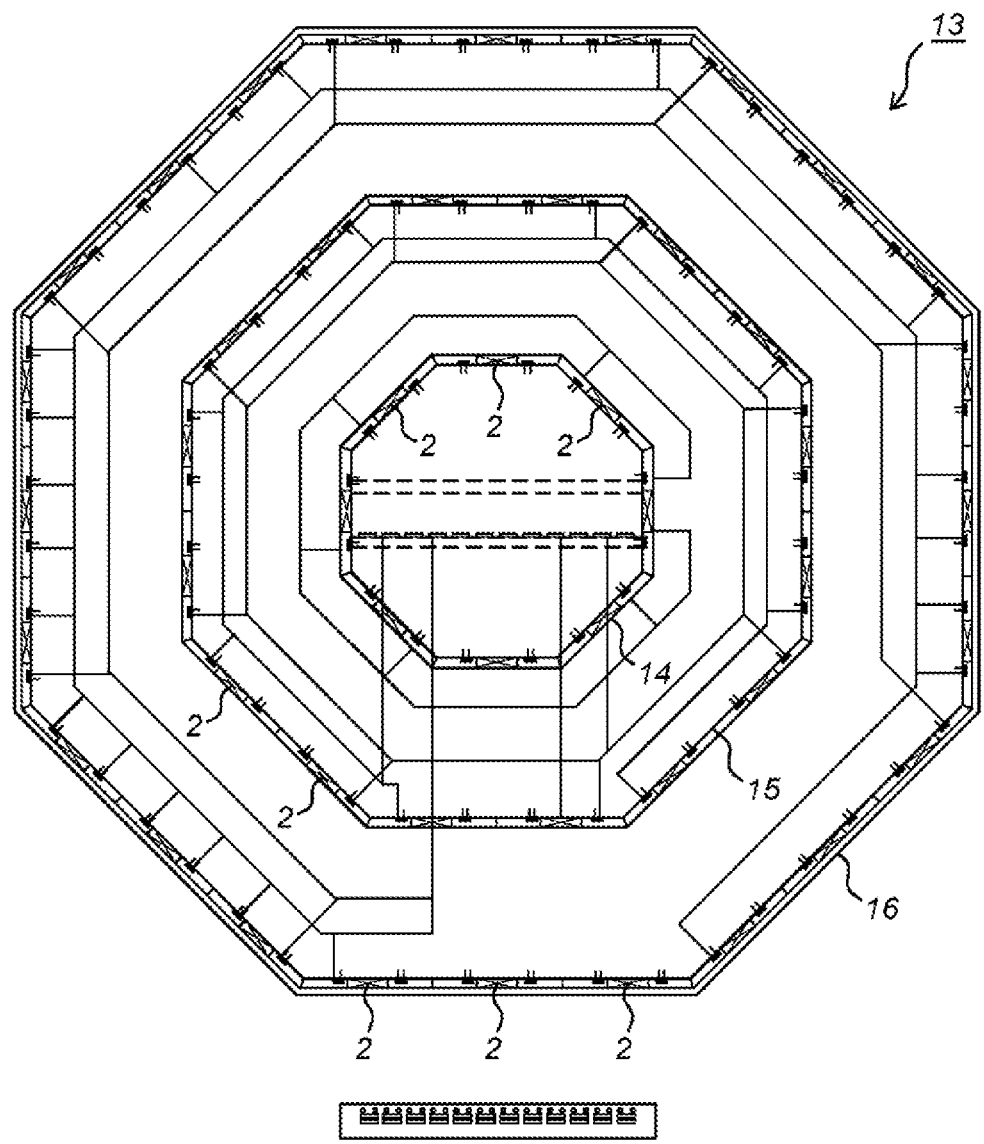
FIG. 2 shows a top view of a buffer according to the present invention.

FIG. 2 shows a top view 13 of a buffer according to the present invention, consisting of a plurality of preferably connected groups 14, 15, 16 of coupled wall parts 2 arranged around each other.

FIGS. 3a, b, c show schematic views 17, 18, 19 of the mutual hydraulic coupling of wall parts 20 according to the present invention in accordance with the Tichelmann principle.

FIG. 4 shows an example of a weighting of measuring points in a system according to the present invention, which adheres to the general guidelines according to the ISSO publication 29 pursuant to the Building Decree 2012, including amendments dated 17 Apr. 2012. The guidelines provided in the ISSO are based on the knowledge gathered from a literature search and experiments. The static and dynamic heat flows of installations have been simulated using computer models. The results of the simulation models have been verified by field measurements, which have contributed toward the final form of these models. For practical use a manual calculation method has been derived with which an installation can be designed in reliable manner on the basis of the building characteristics and comfort requirements. The calculation method consists of eight steps.

1. determining the heat loss through outer walls;
2. determining heat losses to adjacent buildings;
3. determining the heat loss through the roof;
4. determining the heat loss through the floor;
5. determining infiltration or ventilation losses;

6. determining the stationary heat losses;
7. determining the heating-up surcharge;
8. determining the total capacity to be installed.

The calculations of internal heat production and solar irradiation are taken into account here. Determining the capacity to be supplied from the tank consists of the eight steps listed above; six for determining the stationary heat demand, one for the heating-up surcharge and one for the capacity to be finally determined and supplied from the tank at a determined point in time. This capacity is determined every 30 minutes by calculating step 1 to 8 with addition or subtraction of information on the internal heat production and solar irradiation received from the building. An adaptive temperature limit value can in this way be provided in accordance with FIG. 5.

FIG. 5 shows a user interface of software for adjusting the control system according to the present invention.

In another embodiment, an outer wall is arranged around wall parts for the purpose of thus forming a cavity. Wall parts are held in place by clamping elements formed by bags, before being filled with a filler such as cement and after being filled with this filler.

The above stated figures are purely illustrative and in no way limit the scope of protection of the present invention as laid down in the following claims.

The invention claimed is:

1. A heat buffer, comprising an at least partially underground space holding a liquid medium for storing thermal energy, the heat buffer comprising coupled wall parts, wherein each wall part of the wall parts comprises:
    a body discrete from and configured to be connectable to another wall part of the wall parts,
    a liquid throughflow circuit configured for exchanging heat with the liquid medium, and
    one or more hydraulic couplings externally accessible for discharge and supply of a heat exchange liquid to the liquid throughflow circuit; and
    wherein at least a first wall part of the wall parts is configured to be:
        positioned at a mutual angle about a vertical axis to contact an adjacent second wall part of the wall parts, and
        connected to the adjacent second wall part of the wall parts to form connected wall parts,
            such that the connected wall parts at least partially enclose the at least partially underground space, and
            such that the connected wall parts provide a circumferential inner wall for that is in contact with the liquid medium; and
    wherein the heat buffer further comprises a floor and/or cover part for closing a respective underside and/or upper side of the at least partially enclosed at least partially underground space; and
    wherein the heat buffer further comprises an outer wall at a distance from the circumferential inner wall of the connected wall parts, such that the outer wall forms a cavity that at least partly surrounds and is outside the circumferential inner wall of the connected wall parts.

2. The heat buffer as claimed in claim 1, wherein the wall parts are configured to be attached mechanically, comprising, for at least the first wall part of the wall parts, a mechanical coupling provided on the first wall part for attaching the first wall part to the adjacent second wall part of the wall parts.

3. The heat buffer as claimed in claim 1, comprising a plurality of groups of coupled wall parts, wherein a first group of coupled wall parts is arranged to surround a second group of coupled wall parts.

4. The heat buffer as claimed in claim 1, comprising a plurality of groups of coupled wall parts, wherein a first group of coupled wall parts is arranged above a second group of coupled wall parts, wherein a thermal insulation is arranged between the first group of coupled wall parts and the second group of coupled wall parts.

5. The heat buffer as claimed in claim 1, wherein the heat buffer has a volume of between 15,000 m$^3$ and 60,000 m$^3$.

6. The heat buffer as claimed in claim 5, wherein the heat buffer has a volume of between 15,000 m$^3$ and 25,000 m$^3$.

7. The heat buffer as claimed in claim 1, wherein the liquid medium for storing the thermal energy comprises water.

8. The heat buffer as claimed in claim 1, wherein the outer wall comprises concrete.

9. The heat buffer as claimed in claim 1, wherein the cavity surrounding the wall parts is filled with an insulating material.

10. The heat buffer as claimed in claim 9, wherein the insulating material comprises water.

11. The heat buffer as claimed in claim 1, comprising a clamping means arranged at least partially in the cavity surrounding the wall parts for holding a wall part at a position relative to the outer wall.

12. The heat buffer as claimed in claim 1, wherein the connected wall parts are at least partially underground.

13. A method of constructing a heat buffer, comprising:
    arranging an outer wall forming a cavity that at least partially encloses a space that is at least partially underground;
    wherein the cavity further comprises a floor and/or cover part for closing a respective underside and/or upper side of the at least partially enclosed at least partially underground space;
    forming an assembly of connected wall parts within the cavity, at a distance from and at least partially surrounded by the outer wall, such that at least a portion of the cavity is outside at least a portion of the assembly of the connected wall parts, wherein each wall part of the connected wall parts:
        comprises a body discrete from and configured to be connectable to another wall part of the connected wall parts;
        comprises a liquid throughflow circuit configured for exchanging heat with a liquid medium that is disposed in the cavity;
        comprises one or more hydraulic couplings externally accessible for discharge and supply of a heat exchange liquid to the liquid throughflow circuit; and
    wherein at least a first wall part of the connected wall parts is configured to be:
        positioned at a mutual angle about a vertical axis to contact an adjacent second wall part of the connected wall parts; and
        connected to the adjacent second wall part of the connected wall parts,
            such that the connected wall parts at least partially enclose the at least partially enclosed at least partially underground space, and
            such that the connected wall parts provide a circumferential inner wall that is in contact with the liquid medium;

hydraulically coupling the connected wall parts, such that the heat exchange liquid can circulate through the liquid throughflow circuits of the assembly of the connected wall part.

14. The method of constructing the heat buffer as claimed in claim 13, wherein forming the cavity comprises arranging the outer wall prior to forming the assembly of the connected wall parts.

15. The method of constructing the heat buffer as claimed in claim 13, wherein, for a third wall part of the connected wall parts, the liquid throughflow circuit comprises a hose or tube, the body comprises a latticework for holding the hose or tube, and forming the assembly of connected wall parts includes pouring concrete into the latticework.

16. The method of constructing the heat buffer as claimed in claim 13, wherein forming the assembly of the connected wall parts comprises positioning a wall part of the connected wall parts and then fixing the wall part in a position.

17. The method of constructing the heat buffer as claimed in claim 13, wherein forming the assembly of the connected wall parts comprises engaging mechanical couplings between the first wall part of the connected wall parts and the adjacent second wall part of the connected wall parts.

18. The method of constructing the heat buffer as claimed in claim 13, wherein forming the assembly of the connected wall parts comprises arranging the first wall part of the connected wall parts and the adjacent second wall part of the connected wall parts such that a contact surface between the first wall part of the connected wall parts and the adjacent second wall part of the connected wall parts forms a liquid-tight seal.

19. The method of constructing the heat buffer as claimed in claim 13, wherein forming the assembly of the connected wall parts comprises arranging a first group of the connected wall parts around a second group of the connected wall parts in concentric circles or polygons, or arranging the first group of the connected wall parts and the second group of the connected wall parts in a zigzag or meandering line.

20. The method of constructing the heat buffer as claimed in claim 13, wherein forming the assembly of the connected wall parts comprises arranging a first group of the connected wall parts above a second group of the connected wall parts.

21. The method of constructing the heat buffer as claimed in claim 20, further comprising placing a horizontal barrier between the first group of the connected wall parts and the second group of the connected wall parts.

22. The method of constructing the heat buffer as claimed in claim 13, further comprising bringing the assembly of the connected wall parts into contact with the liquid medium that is disposed in the cavity.

23. The method of constructing the heat buffer as claimed in claim 13, wherein arranging the outer wall forming the cavity that at least partially encloses the space that is at least partially underground comprises clearing a space for the outer wall in the ground and filling the cleared space for the outer wall in the ground with cement.

24. The heat buffer as claimed in claim 1, wherein the outer wall at a distance from the circumferential inner wall of the connected wall parts comprises coupled wall parts.

25. The heat buffer as claimed in claim 1, wherein the body of each wall part of the wall parts has a width of between one and four meters, and a height of between ten and sixty meters.

26. The heat buffer as claimed in claim 25, wherein the body of each wall part of the wall parts has a height of between ten and twenty-five meters.

27. The heat buffer as claimed in claim 1, wherein the body of each wall part of the wall parts comprises prefabricated or poured concrete.

28. The heat buffer as claimed in claim 27, wherein the liquid throughflow circuit of each wall part of the wall parts is cast into the concrete.

29. The heat buffer as claimed in claim 1, wherein the liquid throughflow circuit of each wall part of the wall parts is arranged on the wall part.

\* \* \* \* \*